United States Patent
Finn et al.

(10) Patent No.: US 9,619,942 B2
(45) Date of Patent: Apr. 11, 2017

(54) COORDINATE GEOMETRY AUGMENTED REALITY PROCESS

(71) Applicant: F3 & Associates, Benicia, CA (US)

(72) Inventors: Sean Finn, Benicia, CA (US); Carlo Caparas, San Jose, CA (US); Erik Horbatiuk, Oakland, CA (US); Mike Heitman, Walnut Creek, CA (US)

( * ) Notice: Subject to any disclaimer, the term of this patent is extended or adjusted under 35 U.S.C. 154(b) by 0 days.

(21) Appl. No.: 15/089,373

(22) Filed: Apr. 1, 2016

(65) Prior Publication Data

US 2016/0217624 A1    Jul. 28, 2016

Related U.S. Application Data

(63) Continuation of application No. 13/930,369, filed on Jun. 28, 2013, now Pat. No. 9,336,629.

(Continued)

(51) Int. Cl.
| | |
|---|---|
| G09G 5/00 | (2006.01) |
| G06T 19/00 | (2011.01) |

(Continued)

(52) U.S. Cl.
CPC .......... *G06T 19/006* (2013.01); *G01C 15/002* (2013.01); *G06K 9/00671* (2013.01); *G06K 9/2063* (2013.01); *G06K 9/22* (2013.01); *G06K 9/3208* (2013.01); *G06T 7/0042* (2013.01); *G06T 7/0051* (2013.01); *G06T 11/60* (2013.01); *H04N 13/0275* (2013.01); *H04W 88/02* (2013.01); *G06T 2200/04* (2013.01); *G06T 2200/08* (2013.01); *G06T 2207/30204* (2013.01); *G06T 2215/16* (2013.01)

(58) Field of Classification Search
None
See application file for complete search history.

(56) References Cited

U.S. PATENT DOCUMENTS

| | | |
|---|---|---|
| 6,094,625 A | 7/2000 | Ralston |
| 6,166,744 A | 12/2000 | Jaszlics et al. |

(Continued)

OTHER PUBLICATIONS

Leica ScanStation C10 The All-in-One Laser Scanner for Any Application www.leica-geosystems.com/hds 2012.

(Continued)

*Primary Examiner* — Ryan R Yang
(74) *Attorney, Agent, or Firm* — Kilpatrick Townsend & Stockton LLP

(57) ABSTRACT

Embodiments of the invention include a method, a system, and a mobile device that incorporate augmented reality technology into land surveying, 3D laser scanning, and digital modeling processes. By incorporating the augmented reality technology, the mobile device can display an augmented reality image comprising a real view of a physical structure in the real environment and a 3D digital model of an unbuilt design element overlaid on top of the physical structure at its intended tie-in location. In an embodiment, a marker can be placed at predetermined set of coordinates at or around the tie-in location, determined by surveying equipment, so that the 3D digital model of the unbuilt design element can be visualized in a geometrically correct orientation with respect to the physical structure. Embodiments of the present invention can also be applied to a scaled down 3D printed object representing the physical structure if visiting the project site is not possible.

19 Claims, 12 Drawing Sheets

Related U.S. Application Data

(60) Provisional application No. 61/758,606, filed on Jan. 30, 2013.

(51) Int. Cl.

| | | |
|---|---|---|
| *G01C 15/00* | (2006.01) | |
| *H04N 13/02* | (2006.01) | |
| *G06T 7/00* | (2017.01) | |
| *G06T 11/60* | (2006.01) | |
| *H04W 88/02* | (2009.01) | |
| *G06K 9/00* | (2006.01) | |
| *G06K 9/32* | (2006.01) | |
| *G06K 9/20* | (2006.01) | |
| *G06K 9/22* | (2006.01) | |

(56) References Cited

U.S. PATENT DOCUMENTS

| | | |
|---|---|---|
| 6,375,874 B1 | 4/2002 | Russell et al. |
| 7,216,003 B2 | 5/2007 | Faulker et al. |
| 7,365,891 B2 | 4/2008 | Hoffman et al. |
| 7,424,335 B2 | 9/2008 | Swift |
| 9,367,963 B2 | 6/2016 | Finn et al. |
| 2005/0035980 A1 | 2/2005 | Lonsing |
| 2005/0102063 A1 | 5/2005 | Bierre |
| 2008/0252640 A1 | 10/2008 | Williams |
| 2008/0269939 A1 | 10/2008 | Kritchman |
| 2009/0173443 A1 | 7/2009 | Kozlak et al. |
| 2011/0134108 A1 | 6/2011 | Hertenstein |
| 2011/0279445 A1 | 11/2011 | Murphy et al. |
| 2011/0317880 A1 | 12/2011 | Pettersson et al. |
| 2012/0327114 A1 | 12/2012 | Nahon |
| 2012/0327117 A1 | 12/2012 | Weller et al. |
| 2013/0057581 A1 | 3/2013 | Meier |
| 2013/0147839 A1 | 6/2013 | Fukushima et al. |
| 2013/0155106 A1 | 6/2013 | Rolleston et al. |
| 2013/0251199 A1 | 9/2013 | Raghoebardayal |
| 2013/0293585 A1 | 11/2013 | Sudou |
| 2014/0210856 A1 | 7/2014 | Finn et al. |
| 2014/0275760 A1 | 9/2014 | Lee et al. |
| 2015/0379778 A1 | 12/2015 | Finn |

OTHER PUBLICATIONS

Make Your Ideas Real Give Your Creativity a New Dimension by Stratasys 2012.
Faro Edge 2012.
AutoCAD 2012.
Fortus 3D Production Systems 2012.
U.S. Appl. No. 13/930,369 , "Non-Final Office Action", Oct. 2, 2015, 9 pages.
U.S. Appl. No. 13/930,369 , "Notice of Allowance", Jan. 7, 2016, 5 pages.
U.S. Appl. No. 14/018,724 , "Non-Final Office Action", Jul. 22, 2015, 17 pages.
U.S. Appl. No. 14/018,724 , "Notice of Allowance", Aug. 26, 2015, 7 pages.
U.S. Appl. No. 14/846,548 , "Non-Final Office Action", Nov. 10, 2015, 15 pages.
U.S. Appl. No. 14/846,548 , "Notice of Allowance", Feb. 18, 2016, 8 pages.
Ziegler, Elisa, "Real-time markerless tracking of objects on mobile devices", Bachelor of Science Thesis, University of Koblenz and Landau, Jun. 2010.

(Continued from FIG. 3A)

---

Extract coordinates (e.g., Northing, Easting, and Elevation) that are associated with the calculated one or more marker points
315

---

Resurvey the project site in the real environment to determine the extracted coordinates that are associated with the calculated one or more marker points to place the marker in a correct location and orientation in the real environment
317

---

Render the supplemental digital model in a file format suitable for an augmented reality application
319

---

Select a digital marker to be associated with the supplemental digital model, wherein the digital marker has marking elements with a unique pattern configured to be decoded by a mobile device
321

---

Associate the supplemental digital model with the selected digital marker by setting the supplemental digital model to relative distances from the digital marker (i.e., place of calculated marker points) as calculated in the 3D modeling software so that the supplemental digital model is configured to be sized, positioned, and oriented with respect to the size, position, and orientation of marker in the real environment according to relation data between the supplemental digital model and the selected digital marker
323

---

Store a data file comprising the supplemental digital model and the relation data in a data storage, wherein the data file is retrievable from the data storage wherein a physical marker corresponding to the selected digital marker is detected in the real environment by the mobile device running an augmented reality application
325

---

Place the physical marker on the physical structure in the real environment using the surveyed, extracted coordinates
327

FIG. 3B

Center offset distance of X

COORDINATE GEOMETRY AUGMENTED REALITY PROCESS

CROSS-REFERENCES TO RELATED APPLICATIONS

This application is a continuation of U.S. patent application Ser. No. 13/930,369, filed Jun. 28, 2013, which is a non-provisional of and claims priority to U.S. Provisional Patent Application No. 61/758,606, filed on Jan. 13, 2013, entitled "Coordinate Geometry Augmented Reality Process," the disclosures of which are all hereby incorporated by reference in their entirety for all purposes.

BACKGROUND

In the field of architecture, design, and construction, ideas and plans need to be communicated clearly to coordinate successfully with all parties involved in a project. When a project involves modifying an existing structure or constructing a new structure, a new design for an unbuilt structure can be generated in the form of a digital three dimensional ("3D") model using computer modeling software. The 3D digital model can be viewed on a computer screen so that all of the involved parties can discuss their ideas. However, the 3D modeling software is not easy to use for people unless they are trained in using the software. Therefore, all the parties may not be able to fully participate in the discussion, manipulating the 3D digital model shown on the computer screen. Furthermore, while 3D digital models can assist a person to visualize the project on a computer screen, it is not easy for the human brain to translate the information shown on the computer screen and visualize it on-site in the real world. Thus, there is a need to improve the presentation and planning of future projects in the fields of architecture, design, and construction.

Embodiments of the invention address this and other problems, individually and collectively.

SUMMARY

The present invention relates generally to incorporating augmented reality ("AR") technology into the land surveying, 3D laser scanning, and digital model processes. More specifically, the present invention relates to methods and systems for providing an augmented reality image which combines a real view of a physical structure in a real world environment in real-time, overlaid with an image of a 3D digital model of an unbuilt design element at its intended location in the real environment. By incorporating the augmented reality technology into the land surveying, 3D laser scanning, and digital modeling processes, the supplemental digital model can be visualized in a geometrically correct orientation with respect to the physical structure in the real environment according to an intended design (e.g., CAD model). The methods and techniques described herein can be applied to a variety of fields including architecture, design, and construction.

According to one embodiment of the present invention, a method provides coordinate geometry augmented reality for visualizing an unbuilt design element in a real environment. The method includes capturing, using a camera of a mobile device, an image of a physical marker placed on or around a physical structure in the real environment. The physical marker is placed at a predetermined set of coordinates, determined by surveying equipment, on the physical structure at or around a tie-in location for the unbuilt element to be added to the physical structure according to a design. The method also includes analyzing, using a processor, the image of the physical marker to determine a supplemental digital model representing the unbuilt element associated with a digital marker, which corresponds to the physical marker. After analyzing the image of the physical marker, a data file is retrieved from data storage, wherein the data file comprises the supplemental digital model associated with the digital marker and relation data between the supplemental digital model and the digital marker. Thereafter, the mobile device provides, on its display screen, an augmented reality image comprising a real view of the physical structure seen through the camera in real-time, overlaid with the supplemental digital model which is anchored at the physical marker according to the relation data so that the supplemental digital model representing the unbuilt element is seen in a geometrically correct orientation with respect to the physical structure according to the design.

According to another embodiment of the present invention, a mobile device provides coordinate geometry augmented reality for visualizing an unbuilt design element in a real environment. The mobile device includes a processor and a computer-readable medium coupled to the processor and storing a plurality of instructions, which, when executed, cause the processor to provide coordinate geometry augmented reality. The plurality of instructions include instructions that cause the processor to perform the method steps described above.

According to another embodiment of the present invention, a method provides land surveying, 3D laser scanning, 3D modeling, and associating a supplemental digital model with a marker to provide augmented reality. The method includes surveying a real environment with a physical structure, with targets positioned at control points on or around the physical structure, to determine coordinates of the control points in relation to a real-world coordinate system. The method also includes scanning, with a 3D laser scanner, the real environment with the physical structure and the targets positioned at the control points to generate point cloud data having a number of scan points associated with the physical structure. Each scan point is georeferenceable on the real-world coordinate system based on the determined coordinates of the targets positioned at the control points. The method also includes generating a physical structure digital model based on the point cloud data and the determined coordinates of the targets at the control points. Thus, the physical structure digital model is embedded with coordinate data in relation to the real-world coordinate system. The method also includes incorporating a digital model representing an unbuilt element into the physical structure digital model at a desired tie-in location. Thus, the digital model of the unbuilt element is also embedded with the coordinate data in relation to the real-world coordinate system. The method includes selecting at least a portion of the digital model of the unbuilt element to be used as a supplemental digital model for rendering augmented reality visualization. In addition, the method includes selecting a marker location in relation to the supplemental digital model and extracting coordinates associated with the marker location. The supplemental digital model is then associated with a selected digital marker so that the supplemental digital model is configured to be sized, positioned, and oriented with respect to the digital marker according to relation data. A data file comprising the supplemental digital model and the relation data is then generated and stored in data storage. The method also includes storing the data file in data storage, wherein the data file is retrievable from the data storage when a physical marker that corresponds to the selected digital marker is detected in the real environment by a mobile device. The method further includes surveying the real environment to determine the marker location using the extracted coordinates and affixing the physical marker at the market location in the real environment.

According to another embodiment of the present invention, the method provides coordinate geometry augmented reality for visualizing an unbuilt design element off-site in the real environment using a 3D printed object as a substitute for a physical structure in the real environment. The method includes providing a scaled-down 3D printed object of a physical structure in the real environment. The 3D printed object is printed using a 3D printer based on a 3D digital model of the physical structure generated by surveying and laser scanning the physical structure in the real environment. The method also includes providing a physical marker on the 3D printed object at or around a position that corresponds to a tie-in location between the physical structure and an unbuilt design element. The method also includes capturing an image of the physical marker on the 3D printed object using a mobile device running an augmented reality application. The method also includes analyzing, using a processor, the image of the physical marker to determine a 3D digital model of the unbuilt element associated with the marker. The method also includes retrieving, from data storage, a data file comprising the 3D digital model of the unbuilt element associated with the marker. The method further includes providing, on a display screen of the mobile device, an augmented reality image comprising a real view of the 3D printed object seen through the camera in real-time and the 3D digital model of the unbuilt element overlaid on top of the 3D printed object. In the augmented reality image, the 3D digital model of the unbuilt element is displayed according to the physical marker location and orientation so that the 3D digital model of the unbuilt element is seen in a geometrically correct orientation with respect to the 3D printed object.

These and other embodiments of the invention are described in further detail below with references to the Figures and the Detail Description.

BRIEF DESCRIPTION OF THE DRAWINGS

FIGS. 3A-3C shows a flow diagram illustrating a method of land surveying, 3D laser scanning, 3D modeling, associating a supplemental digital model with a marker, and AR processing according an embodiment of the invention.

DETAILED DESCRIPTION

Figure 1:
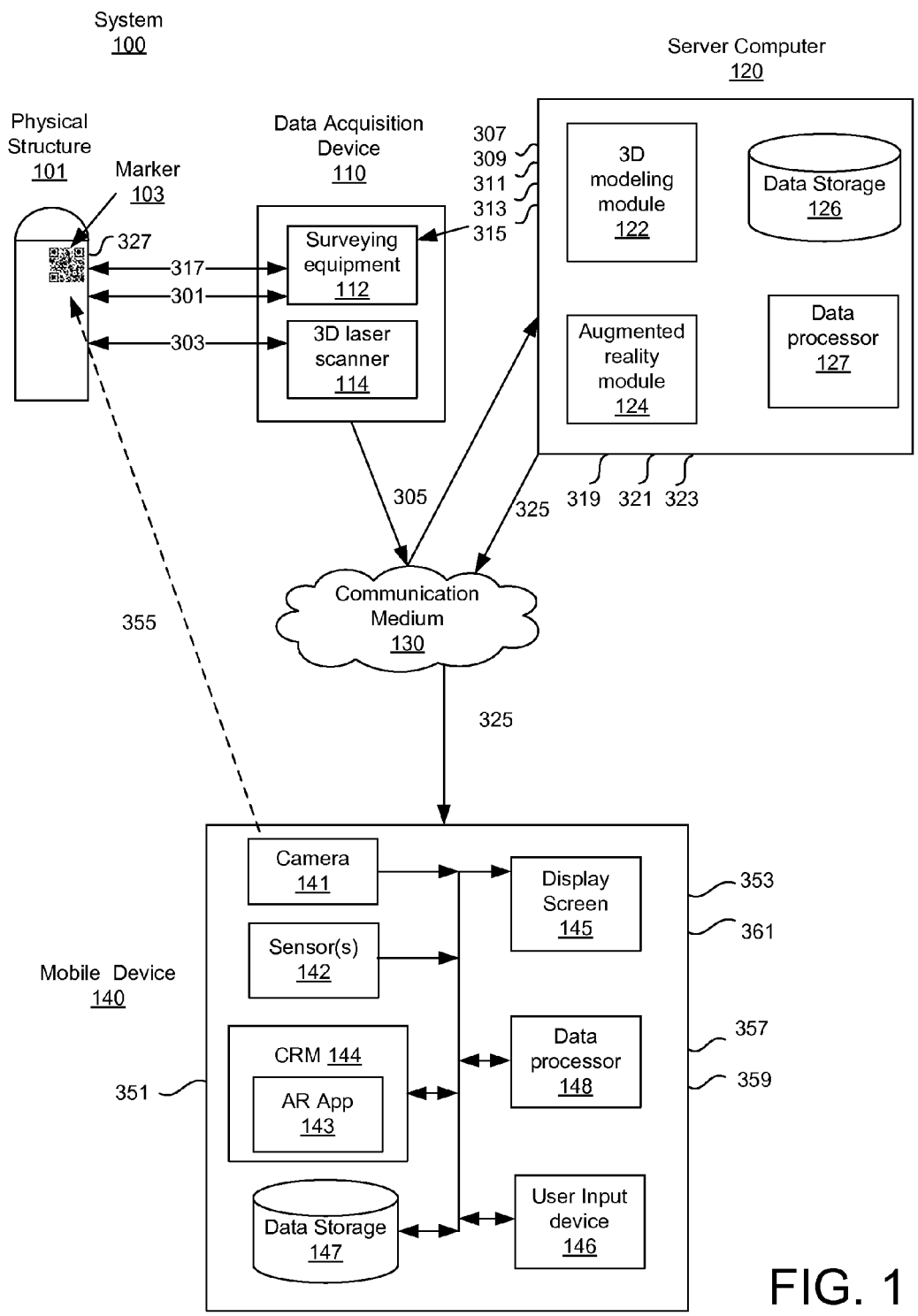
FIG. 1 shows a block diagram of a system according to an embodiment of the invention.

With the growth of mobile devices, augmented reality ("AR") has become popular in the retail and entertainment industry. Some mobile AR applications require the use of markers or image recognition capabilities to position a virtual object in a real environment. While the current use of markers, such as QR codes, is sufficient for the retail and entertainment industry, their use is not suitable for the civil engineering and construction industry. For example, AR technology needs to render an unbuilt design element at a precise location and in a correct geometric orientation with respect to existing physical structures in the real-world environment.

In some AR applications, a global positioning system (GPS) associated with a mobile device has been used to render visualization of a virtual object or a digital model at a desired geo-location in a real environment. However, the GPS location provided by a mobile device is not accurate enough for many civil engineering and construction projects. For example, the GPS location provided by a mobile device can deviate from true, real-world coordinates by several inches or more. Thus, when a construction project involves visualizing whether an unbuilt design element can potentially clash into an existing physical structure on site, the offset of digital model visualization by a few inches, or even a fraction of an inch, can be detrimental to the project. Thus, the use of GPS for rendering visualization of a digital model of an unbuilt design element in a real environment is often not accurate enough in the civil engineering and construction industry.

In embodiments of the present invention, the accuracy of a digital model's position in the real environment has been greatly improved by integrating the augmented reality process with land surveying, 3D laser scanning, and digital modeling processes. Through these integrated processes, any potential clashes of an unbuilt design element with the existing physical structures can be visualized in the real environment prior to construction. Further, any alternative unbuilt design elements or a construction sequence can be visualized on site in the real environment.

As an illustration, a construction project may involve adding a new pipe (which is currently unbuilt but in the design phase) to an existing physical structure (e.g., a vessel in an oil refinery field). To visualize appearance of the new, unbuilt pipe added to the existing vessel at its intended location, the project site with the existing vessel is surveyed and laser scanned to create a 3D digital model of the vessel. A 3D digital model of the new, unbuilt pipe is then imported and incorporated into the 3D digital model of the vessel at a desired tie-in location according to a design. Thereafter, the digital 3D model of the unbuilt pipe is associated with a marker, which is detectable and decodable by a mobile device running an AR application. Subsequently, a marker is placed in the real environment (e.g., on the vessel in the field) at precise, real-world coordinates at or around the tie-in location determined by land surveying equipment. The mobile device, upon capturing an image of the marker placed on the vessel, retrieves the 3D digital model of the new pipe associated with the marker and overlays it on top of the vessel in the real environment according to the position and orientation of the marker. Thus, the 3D digital model of the unbuilt pipe can be visualized in real-time, in the real environment at its precise, intended location.

Embodiments of the present invention provide several advantages. Because most people are visual learners, augmented reality can be used as a tool to display virtual designs in the context of the true, existing environment in real-time. This is particularly useful in the fields of architecture, design, and construction. For example, the designers would have the capability of viewing their designs in the actual environments in which they would be used. They can view the overall aesthetic appearance of their designs in selected environments. Contractors can use it to view virtual building components and dimensions as a building is being constructed or use it to compare the accuracy of the built structure to the virtual model. This technology can also be included in plan sets to provide extra information and view the location of the current two dimensional ("2D") view relative to the overall structure in 3D. The integration of augmented reality into the civil industry is highly beneficial in communicating plans and designs.

Embodiments of the present invention have a number of other applications. For example, embodiments of the present invention can be applied to simulations for refinery turnarounds. A turnaround is a planned, periodic shut down of a refinery process unit to perform maintenance and replacement of old parts. The turnaround process (e.g., removing an old part and incorporating a new part) can be animated so that engineers can visualize the process prior to a scheduled turnaround. Any clearance issues or potential pitfalls of the turnaround process can be determined and visualized using embodiments of the present invention. In another example, in the event of a fire at a building or other structures, a fire can be simulated using embodiments of the present invention to illustrate any structural issues related to the building which contributed to the spread of the fire.

Examples of embodiments of the present invention are illustrated using figures and are described below. The figures described herein are used to illustrate embodiments of the present invention, and are not in any way intended to limit the scope of the invention.

FIG. 1 shows a schematic diagram illustrating a system 100 that have a number of components to integrate AR technology with land surveying, 3D laser scanning, and 3D modelling processes according to an embodiment of the invention. The system 100 includes a physical structure 101 located on a project site in a real environment. The system 100 also includes a data acquisition device 110 which is used to survey and laser scan the physical structure 101 to generate point cloud data with points at known coordinates. The system 100 shown in FIG. 1 also includes a server computer 120 which receives the point cloud data from the data acquisition device 110 and generates 3D digital models embedded with coordinate data. The server computer 120 can also associate a 3D digital model with a marker for augmented reality visualization. In addition, the system 100 includes a mobile device 140, which may be used to capture an image of a marker placed on the physical structure 101 in the real environment to initiate and facilitate augmented reality process of visualizing a 3D digital model in a geometrically correct orientation with respect to the physical structure according to an intended design.

All the components shown in FIG. 1 (e.g., the data acquisition device 100, the server computer 120, and the mobile device 140) can communicate with one another via communication medium 130, which may be a single or multiple communication mediums. The communication medium 130 may include any suitable electronic data communication medium including wired and/or wireless links. The communication medium 130 may include the Internet, portions of the Internet, or direct communication links. In some embodiments, the components shown in FIG. 1 can receive data from one another by sharing a hard drive or other memory devices containing the data.

Referring to FIG. 1, the data acquisition device 110 may include surveying equipment 112 and a 3D laser scanner 114. The surveying equipment 112 and the 3D laser scanner 114 gather data from the physical structure 101. While the surveying equipment 112 and the 3D laser scanner 114 are shown in the same enclosure 110, they can be separate devices in separate enclosures.

The surveying equipment 112 can be used to survey the physical structure 101 on a project site in a real environment, with targets positioned at control points on or around the physical structure 101. Through surveying, the coordinates of the control points in relation to a real world coordinate system can be determined. Examples of surveying equipment include total stations, theodolites, digital levels, survey transits, or the like. The surveying equipment can be used to perform horizontal and/or vertical measurements to specify locations in 3D on the earth using coordinates. The surveying equipment typically reports each surveyed target's coordinates in terms of "Northing, Easting, Elevation."

In embodiments of the present invention, real-world coordinates of a control point or any location refers to its horizontal position on the surface of the earth and its vertical position (e.g., elevation). The horizontal position of a location can be defined by any suitable real-world coordinate system such as a global coordinate system, a national coordinate system, state coordinate system (e.g., NAD 83, NAD 88, or the like), a local plant grid system, or the like. The vertical position or an elevation of a location can be defined according to an elevation datum. An elevation datum may be based on an elevation above Mean Sea Level, a gravity based geodetic datum NAVD88, NAD 27, or the like. Any other suitable horizontal datum and elevation datum can be used to define a point or a location in space on the earth in terms of real-world coordinates.

The 3D laser scanner 114 shown in FIG. 1 captures the project site with the physical structure 101 in the real environment in the form of points called point clouds. Any suitable 3D laser scanner can be used in embodiments of the present invention. Examples of 3D laser scanners include Leica ScanStation™ manufactured by Leica Geosystems™, Trimble FX™ or GX™ Scanner manufactured by Trimble, other 3D laser scanners from other manufacturers, such as Faro™, Riegl™, Optech™, or the like.

While not illustrated in FIG. 1, the 3D laser scanner 114 includes a number of components, such as a laser emitter and a detector. In 3D laser scanning, a laser beam is emitted from a laser emitter which is reflected off the surface of the physical structure 101 in the real environment. The reflected light from the physical structure 101 is captured by the detector, generating a point cloud associated with the physical structure by determining phase shift or "time-of-flight." In an embodiment, the points can be mapped out in space based on the laser's time of flight. The scanner's range finder determines the object's distance by timing the light pulse's round-trip. This is given by the equation: $d=(c*t)/2$ where d is distance, c is speed of light, and t is round-trip time. Each point in the point cloud indicates a location of a corresponding point on a surface of the physical structure 101.

In order to position the point clouds accurately in an environment's coordinate system and align the point clouds, targets can be used to tie the clouds together. The targets can be placed on the control points (e.g., used during surveying) so that points in the cloud are assigned coordinates (horizontal and vertical coordinates). Two to three targets are typically needed for each scanner setup to accurately establish the point cloud's location in the coordinate system. Typically, multiple point clouds are stitched together during registration. In FIG. 1, while only a single physical structure 101 is shown, any number of different physical structures in the real environment can be scanned at once.

Referring to FIG. 1, the system 100 also includes a server computer 120. The server computer 120 can include a 3D modeling module 122, an augmented reality module 124, a data storage 126, and a data processor 127. A module can include hardware, software, or a combination of thereof, which performs a set of functions. While the 3D modeling module 122 and the augmented reality module 124 are illustrates as separate modules, they can be integrated into a single module. In addition, there are a number of other components (e.g., memory, input/output module, or the like) in the server computer 120 which are not illustrated in FIG. 1.

The 3D modeling module 122 can include computer-aided design software, such as AutoCAD™, which can be used to generate a 3D digital model (e.g., 3D solids) of the physical structure 101 ("a physical structure digital model"). A 3D digital model refers to a three dimensional representation of a physical structure (or an unbuilt design element) in a digital format which can be viewed on a computer screen or other electronic devices. In one embodiment, the point clouds obtained from a 3D laser scanner can be imported into the 3D digital modeling module 122 and processed by the data processor 127 to be traced over when constructing a 3D digital model. Therefore, a 3D digital model is an intelligent model—it can contain georeferenced real-world coordinates for any point embedded on the 3D digital model. In addition, a 3D digital model can include any amount of information related to the physical structure 101. These include, for example, the shape, the dimensions, material properties, cost, or the like, of the physical structure 101.

The 3D modeling module 122 in the server computer 124 can also be used to generate or import 3D digital models of unbuilt design elements. In a construction project where a new, unbuilt design element is to be added to an existing physical structure, a 3D digital model of the unbuilt design element ("unbuilt element digital model") can be incorporated into the physical structure digital model at a desired tie-in location according to a design plan. The tie-in location (also referred to as touch-point coordinates) is where the unbuilt element digital model touches the physical structure digital model (in other words, where the new, unbuilt element is to physically touch the existing physical structure). A composite digital model, which includes the physical structure digital model and the unbuilt element digital model incorporated at the tie-in location, can be stored in the data storage 126. In addition, a portion of the unbuilt element digital model (or the entire digital model) can be isolated and stored as a supplemental digital model for augmented reality visualization. The supplemental digital model can be stored in the data storage 126, transmitted to the mobile device 140 for storage, and/or uploaded to an AR software server to allow for mobile device retrieval.

The server computer 120 can also include an augmented reality module 124. The augmented reality module 122 can be a software application that can run on a number of different platforms. While the augmented reality module 124 is shown as part of the server computer 120, it can be included in a mobile device 140, and its functions can be performed entirely or partly by the mobile device 140 depending on the memory and the processor power of the mobile device 140. In an embodiment, any suitable commercially available augmented reality software can be modified and applied in embodiments of the present invention. For example, AR softwares from ShowCase™, Metaio™, Augment™, or any other suitable AR software applications can be modified and customized according to embodiments of the present invention.

In embodiments of the present invention, the augmented reality module 124 can also be used to associate a supplemental digital model with a selected digital marker so that the supplemental digital model can be displayed as a virtual object overlaid on top of a physical marker (corresponding to the digital marker) in the real environment using a mobile device. A marker can have a two or three dimensional image or a graphic design with marking elements with a unique pattern that can be detected and decoded by the mobile device 140. For example, a marker can include a QR code, a UPC code, a bar code, a painting, a photograph, or any other suitable images. In some embodiments, a marker can include marking elements that can be camouflaged and blended with the real environment for aesthetics. In embodiments of the present invention, a marker which is in the digital environment (e.g., shown on the computer screen) can be referred to as a digital marker, and the marker which is provided in the real, physical environment can be referred to as a physical marker (e.g., printed on paper). A physical marker that corresponds to a digital marker has the same marking elements as the digital marker. As described in detail below in relation to FIGS. 3A-3C, the physical marker 103 can be placed at precise coordinates on the project site in the real environment using the surveying equipment 112.

Referring to FIG. 1, the system 100 also includes the mobile device 140 which can be used to capture an image of the physical marker 103 and to view an augmented reality image. Examples of the mobile device 140 include any handheld computing device, such as a smartphone, a tablet computer, a gaming device, or a wearable device, such as glasses, or a combination thereof. As shown in FIG. 1, the mobile device 140 has a number of components, including a camera 141, which can be used to detect and capture an image of the physical marker 103 and to view the project site with the physical structure 101 in the real environment. Any real scenes seen through the camera and/or any images retrieved from a data storage 147 (or retrieved from the server computer 120 or a third party AR server) can be processed by a data processor 148 and displayed on a display screen 145 of the mobile device 140. User input device 146 can include buttons, keys, or a touch screen display which can receive user input.

The mobile device 140 also includes a computer-readable storage medium 144 which has an AR application 143, which can run on the mobile device to initiate and facilitate AR processing so that a user can visualize 3D augmented reality scenes on the display screen 145. The AR application can include a plurality of instructions, which when executed by the processor, allows a user to interact with the real environment seen through the camera of the mobile device and retrieved 3D digital models at the same time. For example, the plurality of instructions include instructions that cause the processor to capture, using the camera of a mobile device, an image of a physical marker placed in the real environment with a physical structure. The physical marker is placed at a predetermined set of coordinates, determined by surveying equipment, at or around a tie-in location for an unbuilt element to be added to the physical structure according to a CAD design. The plurality of instructions also include instructions that cause the processor to analyze the image of the physical marker to determine a supplemental digital model representing the unbuilt element associated with a digital marker, which corresponds to the physical marker. The plurality of instructions further include instructions that cause the processor to retrieve, from data storage, a data file comprising the supplemental digital model associated with the digital marker and relation data between the supplemental digital model and the digital marker. The plurality of instructions further include instructions that cause the processor to provide, on a display screen of the mobile device, an augmented reality image comprising a real view of the physical structure seen through the camera in real-time, overlaid with the supplemental digital model in relation to the physical marker according to the relation data. This results in the supplemental digital model of the unbuilt element being displayed in a geometrically correct orientation with respect to the physical structure according to the design.

In addition, the mobile device 140 can include one or more sensors 142, such as a GPS device, a gyroscope, and an accelerometer. In one implementation, one or more sensors can be used to position and track a 3D digital model relative to the user. For example, the gyroscope and accelerometer can be used to calculate the elevation and distance between the physical marker 103 and the mobile device 140 in order to rotate, scale, and skew the 3D digital model to the appropriate perspective in the real-world view shown on the display screen 145. In another implementation, the 3D digital model can be visualized via the AR application based on the physical marker position and orientation in the real environment without using these sensors in the mobile device.

Figure 2:
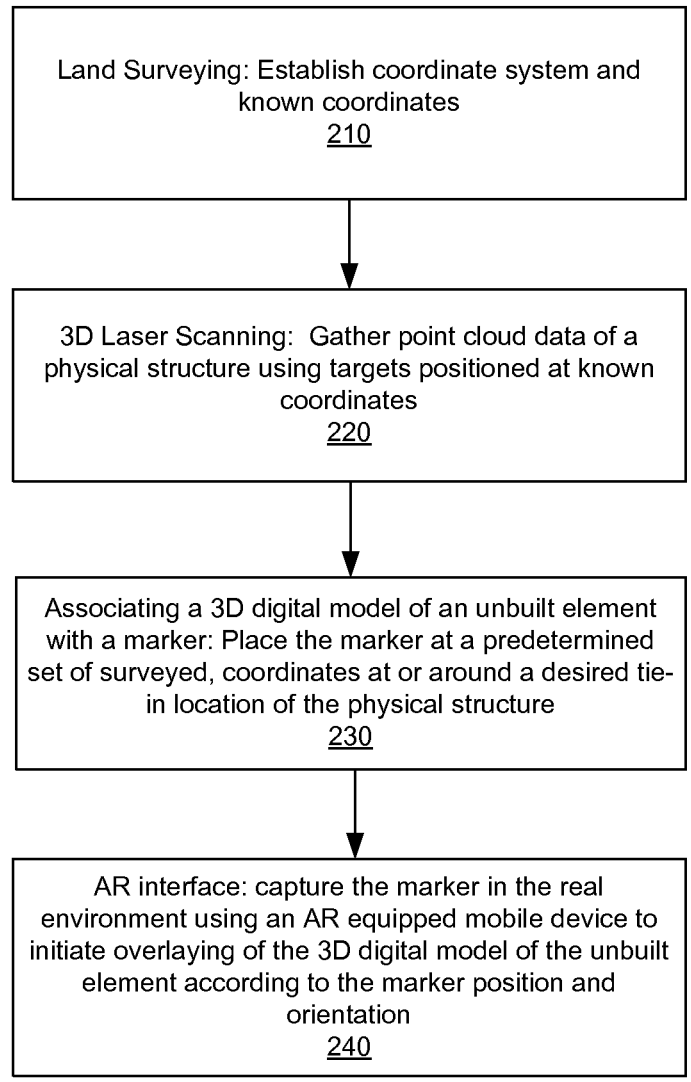
FIG. 2 shows a flow diagram illustrating a method of providing coordinate geometry augmented reality according to an embodiment of the invention.

FIG. 2 shows a flowchart illustrating an exemplary, broad overview of coordinate geometry processing to augmented reality processing according to an embodiment of the invention. In step (210), land surveying is performed to establish a coordinate system and known coordinates using a surveying equipment. In step (220), the 3D laser scanning is performed using a 3D laser scanner in the real environment with a physical structure to gather point cloud data using targets positioned at known coordinates. In step (230), a 3D digital model of an unbuilt element, which is planned to be incorporated into the physical structure at a tie-in location, is associated with the marker in an AR module. In step (240), the AR interface is provided by a mobile device running an AR application. The marker, which is placed at a predetermined set of surveyed, coordinates on the project site, is captured by the camera of the mobile device and is decoded to determine the 3D digital model associated with the marker. Thereafter, the mobile device retrieves a data file including the 3D digital model from data storage and provides an augmented reality image comprising the physical structure in the real environment seen through the camera in real-time, overlaid with the 3D digital model in a geometrically correct orientation with the physical structure at the tie-in location according to an intended design.

Figure 5:
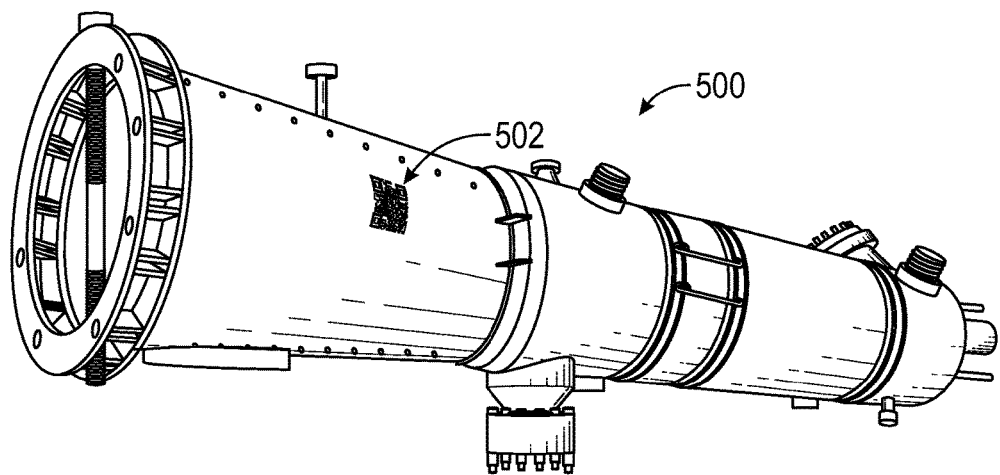
FIG. 5 shows a vessel in a refinery laydown yard with a marker placed on the vessel according to an embodiment of the present invention.
Figure 6:
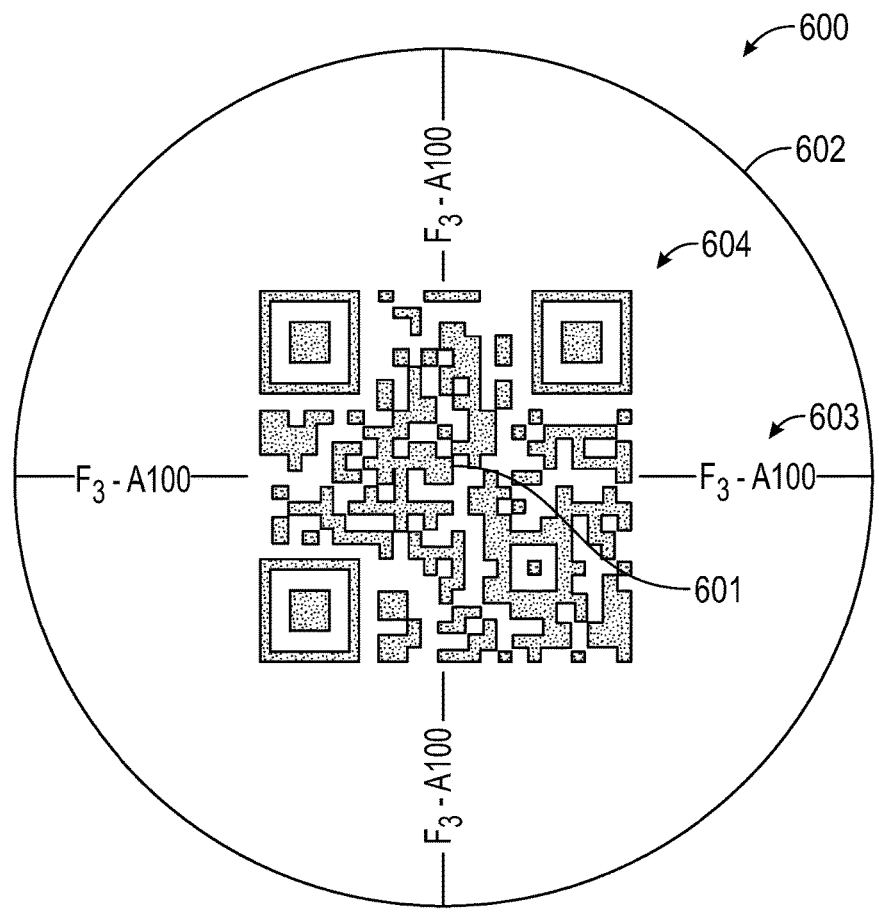
FIG. 6 shows a marker comprising a Quick Response code ("QR code") according to an embodiment of the present invention.

FIGS. 5 and 6 can be used to further illustrate some of the steps discussed in relation to FIG. 2. FIG. 5 shows a physical structure, such as a vessel 500 in a refinery laydown yard, which can be surveyed and laser scanned. On the vessel 500, a target 502 (additional targets not shown) is placed at known coordinates as determined by the surveying step in step (210). In step (230), a marker 600 that includes a QR code 604 is associated with a 3D digital model so that when an AR equipped mobile device captures and detects the marker 600 in the real environment, the associated 3D digital model is retrieved for augmented reality visualization. The marker 600 is placed and overlaid on the on-site target location 502 if the target location is a tie-in location for the 3D digital model of an unbuilt design element. As shown in FIG. 6, the QR code 604 is overlaid over a target 602 with a cross-hair 603. In step (240), an AR equipped device (e.g., a mobile device) can be used to scan the marker 600 placed on the vessel 500 to initiate overlaying of the 3D digital model associated with the marker 600 on top of the marker location. In an embodiment, the cross-hair 603 can be used to provide bearings so that the 3D digital model is oriented correctly in space in relation to the vessel 500.

It should be appreciated that the specific steps illustrated in FIG. 2 provides a particular method of coordinate geometry processing to augmented reality processing according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3A:
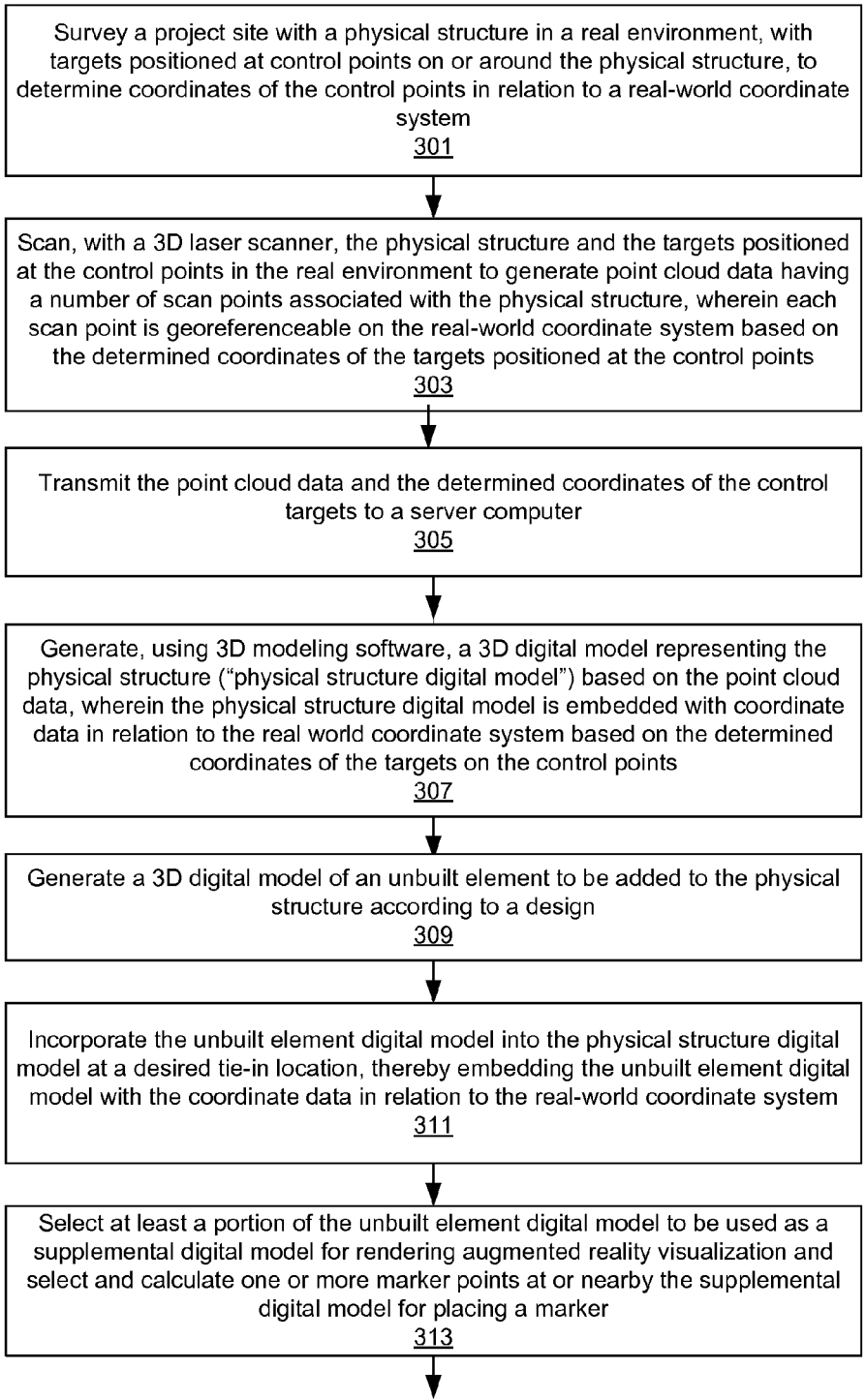

FIGS. 3A and 3B show a flowchart illustrating a method for land surveying, 3D laser scanning, 3D digital modeling, and associating a marker with a digital model according to an embodiment of the present invention. Each step shown in FIGS. 3A and 3B is also illustrated in FIG. 1 with references to components of the system 100 associated with each step.

In step (301), the surveying equipment 112 is used to survey a real environment (e.g., a project site) with a physical structure 101. The physical structure can be a building, a vessel, or any georeferenceable structure that is fixed to the earth so that any location on the physical structure is definable by a set of coordinates. The targets are placed on the control points on or around the physical structure. Using the surveying equipment, the coordinates of the control points are determined in relation to a real-world coordinate system. For example, each control point can be defined in terms of "Northing, Easting, Elevation" based on a selected coordinate system.

In step (303), the physical structure 101 on the project site in the real environment can be scanned using the 3D laser scanner 114 with targets placed on the same control points as during surveying to obtain point cloud data associated with the physical structure 101. The point cloud data provides information related to various geometric parameters associated with the physical structure, such as dimensions and angles of various portions of the physical structure 101 in relation to one another. Also, since the physical structure 101 is scanned with the targets placed on the same control points used during surveying, points in the cloud associated with the physical structure 101 can be assigned coordinates in relation to the real-world coordinate system.

In step (305), the point cloud data associated with the physical structure 101 and the coordinates of the control targets are transmitted to the server computer 120 for 3D modeling of the physical structure 101. Using the point cloud data, the 3D modeling module 122 can generate a 3D digital model of the physical structure 101 ("a physical structure digital model") on a screen of a computer or other electronic devices in step (307). Once the physical structure digital model is generated based on the point cloud data, the dimensionally correct physical structure digital model can be viewed from any perspective within the virtual 3D environment. Since each point in the point cloud data is assigned coordinates (e.g., Northing, Easting, and Elevation) in a real-world coordinate system, the physical structure digital model is embedded with coordinate data in relation to the real-world coordinate system. For example, any point on the surface of the physical structure digital model can be clicked and selected by a user to obtain coordinates of any locations on the physical structure digital model. Since the physical structure digital model is produced using accurately surveyed and scanned geometric and coordinate data, the geometric and coordinate data (e.g., dimensions, angles, coordinates, or the like) of the digital model displayed on a computer screen is generally within ⅛ of an inch of actual parameters of the physical structure 101 with at least a 95 percent confidence level.

While the physical structure digital model is most accurately reproduced by surveying and laser scanning the physical structure on the project site by performing the steps (301) through (307), the physical structure digital model may be reproduced from blue prints or 2D sets of drawings with coordinate data from land surveying.

In step (309), a 3D digital model of a new, unbuilt element, which is in the design phase, can be generated using the 3D modeling module 122. Alternatively, the 3D digital model of the unbuilt element created by another software application can be imported into the 3D modeling module 122. In one embodiment, the unbuilt design element can be a new part (e.g., a new pipe) to be added to an existing structure (e.g., a vessel). In another embodiment, the unbuilt design element can be a separate structure (e.g., a new building) to be added at a selected environment, such as an empty lot, at specific georeferenced real-world coordinates.

In step (311), the 3D digital model of the unbuilt element ("unbuilt element digital model") is incorporated into the physical structure digital model at a desired tie-in location to generate a composite 3D digital model according to an intended design. A tie-in location or "touch-point coordinates" are the location where the two digital models physically touch each other. In other words, this is the location where the unbuilt design element, when constructed, is to physically touch the physical structure 101 in the real environment. By importing the unbuilt element digital model at a specific tie-in location of the physical structure digital model embedded with coordinate data, the unbuilt element digital model also becomes embedded with the coordinate data in relation to the real-world coordinate system. Thereafter, real-world coordinates associated with the tie-in location or any point in the unbuilt element digital model can be identified by clicking on a selected point.

In step (313), the method includes selecting at least a portion of the unbuilt element digital model shown in the 3D modeling module 122 to be used as a supplemental digital model for augmented reality visualization. If an unbuilt element is relatively small in size, then the entire unbuilt element digital model can be used as a supplemental digital model for augmented reality visualization. However, when the unbuilt element is relatively large or long, a selected area or portion of the unbuilt element digital model may be isolated as a supplemental digital model. For example, if the unbuilt design element is a long gas pipe over 100 feet long, then only a portion of the gas pipe (e.g., a 10 feet portion) may be selected as a supplemental digital model to be visualized during an augmented reality process. Since a person with a mobile device may typically stand about 5 to 20 feet away from the location of a physical marker to capture the marker and visualize a supplemental digital model, only a portion of the long gas pipe 3D model may be visualized at a time. Generally, a client of the project is interested in how the unbuilt design element ties into the rest of the existing physical structure or whether it conflicts with the existing physical structure. As such, a portion of the gas pipe digital model that includes such points of interest (e.g., a tie-in location) may be selected as a supplemental digital model for visualization. Other portions of the gas pipe digital model may be isolated separately and visualized using separate markers placed at their corresponding marker locations.

In step (313), the method also includes selecting and calculating one or more marker points in the 3D modeling module which can be used for placing a marker. The marker points are used to determine the marker's location and orientation in relation to the supplemental digital model. For example, if the center marker point is selected to be at the center of the mass of the supplemental digital model, then the two center points will align and overlap. The relative distance information between the center marker point and the center of the mass of the supplemental digital model is provided to the AR module in step (323) to preserve this positional relationship. In another example, if the center marker point is selected to be offset from the center of the mass of the supplemental digital model, then the relative distance between the two center points can be calculated. The relative distance between the two center points is input into the AR module in step (323) when the supplemental digital model is associated with the marker. Additional marker points (e.g., at selected bearings surrounding the center marker point) may be selected and calculated for orientating the marker in relation to the supplemental digital model. Examples of relative distance calculations are described below in relation to FIGS. 9A-9G.

In one embodiment, one or more marker points may be selected at the tie-in location of the unbuilt element and the physical structure. In another embodiment, when the tie-in location is not at a convenient location to place a physical marker on the project site, then any suitable location nearby the tie-in location can be selected as a marker location as long as the marker location and the tie-in location can be seen within the display screen of a mobile device simultaneously. In yet another embodiment, one or more marker points for placing a marker can be selected in the 3D modeling module at any other suitable locations nearby a portion of the unbuilt element digital model where augmented reality visualization is desired.

In step (315), the method includes extracting coordinates (e.g., Northing, Easting, and Elevation) that are associated with the one or more marker points in the 3D modeling module. In step (317), after extracting the coordinates for the marker points, the extracted coordinates are inputted into the surveying equipment 112 to determine the location of the extracted coordinates on the project site in the real environment. After determining the locations of the extracted coordinates, the marker point locations on the physical structure 101 (or on the project site) may be labeled for placing the physical marker later in step (327).

Although the re-surveying step is typically performed to determine the coordinates of marker points, the re-surveying step may be omitted in some instances. For example, if the tie-in location for the supplemental digital model to the physical structure happens to be at one of the target control points (with known coordinates), the target control points can be used to affix the physical marker.

In step (319), the supplemental digital model can be converted into a file format suitable for the AR module. If the AR module accepts a file format of 3D modeling software, such as AutoCAD, then this step may be omitted. However, if the AR module does not accept a file format of the 3D modeling software, then the supplemental digital can be converted using 3ds Max or other suitable surface texturing software so that it can be used in the AR module.

In step (321), the method includes selecting a digital marker to be associated with the supplemental digital model in the AR module 124. The digital marker has marking elements with a unique pattern configured to be decoded by the mobile device. In an embodiment, the AR module 124 in the server computer 120 can generate and provide a number of digital markers from which a user can select. Alternatively, the user can import an image (e.g., 2D or 3D) with marking elements from other sources and use it as a digital marker in embodiments of the present invention. The marking elements of the digital marker can be analyzed and decoded by the processor of the mobile device 140 to determine and retrieve a data file associated with the digital marker.

In step (323), the supplemental digital model in a suitable file format from step (319) is associated with a selected digital marker. Association refers to matching a particular supplemental digital model with a selected digital marker so that when a physical marker (corresponding to the digital marker) is captured and decoded by the mobile device 140 in the real environment, the associated supplemental digital model is retrieved for augmented reality visualization. After association, relation data (how the supplemental digital model is sized, positioned, and oriented with respect to the digital marker) is determined. The relation data can be used to accurately position the supplemental digital model based on the size, position, and orientation of the physical marker in the real environment. In an embodiment, the marker is positioned at or around the tie-in location of the supplemental digital model so that the user can visualize how the unbuilt element represented by the supplemental digital model ties in with the existing physical structure on site. An example of association of the supplemental digital model and the selected marker are described below in relation to FIGS. 9A to 9G.

In some embodiments, the selected digital marker may be associated with more than one supplemental digital model. For example, the digital marker may be associated with two alternative supplemental digital models for a particular unbuilt design element (e.g., option A and option B for new pipe designs). The physical marker (corresponding to the digital marker), when captured and decoded by a mobile device, may provide an interactive user interface which allows the user to choose to a data file which contains, for example, option A supplemental digital model or option B supplemental digital model for visualization.

In step (325), the method includes storing a data file that includes the supplemental digital model and the relation data between the supplemental digital model and the selected digital marker. In some embodiments, the data file may further include supplemental content associated with the supplemental digital model. Examples of supplemental content may include information about the construction materials to be used for the unbuilt design element represented by the supplemental digital model, the physical dimensions of the unbuilt element, the real-world coordinates associated with the unbuilt element, the production cost, or the like. The supplemental content may also be animated, auditory, visual, or a combination thereof. The supplemental content may further include a recommended viewing angle or distance to view an augmented reality image using the mobile device 140 on the project site.

The data file can be stored in the data storage 126 of the server computer 120 and/or stored in a third party site (e.g., an AR software server). The data file may also be transmitted to the mobile device 140 for local storage for retrieval of a supplemental digital model. The local storage, instead of remote server storage, provides security of data, and the Internet connectivity is not for retrieval of the data file. In embodiments of the present invention, the data file is retrieved by the mobile device 140 when a physical marker that corresponds to the digital marker is detected or captured by the mobile device 140.

In step (327), the digital marker associated with the supplemental digital model can be printed as a physical marker (e.g., the marker 103) on a physical surface and placed in the real environment at the surveyed, extracted coordinates as described in step (315). Generally, the physical marker is affixed to the existing physical structure 101 on the project site. For example, if the tie-in location between the physical structure and the unbuilt element is selected as a marker location, the center of the marker 604 can be aligned and positioned at the center of the tie-in location determined by the surveying equipment on the physical structure. Since the coordinates of the center of the tie-in location are based on surveyed and scanned data, the marker (e.g., the center of the marker) can be placed within about ⅛" (⅛ of an inch or ¹⁄₁₀₀ of a foot) accuracy of the actual coordinates in a real-world coordinate system with at least a 95 percent confidence level. This results in a more accurate representation of the unbuilt element with respect to the physical structure 101 in an augmented reality image viewed through the mobile device 140.

It should be appreciated that the specific steps illustrated in FIGS. 3A and 3B provide a particular method of surveying, laser scanning, 3D modeling, and associating a marker with a 3D digital model according to an embodiment of the present invention. Other sequences of steps may also be performed according to alternative embodiments. For example, alternative embodiments of the present invention may perform the steps outlined above in a different order. Moreover, the individual steps illustrated in FIGS. 3A and 3B may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3C:
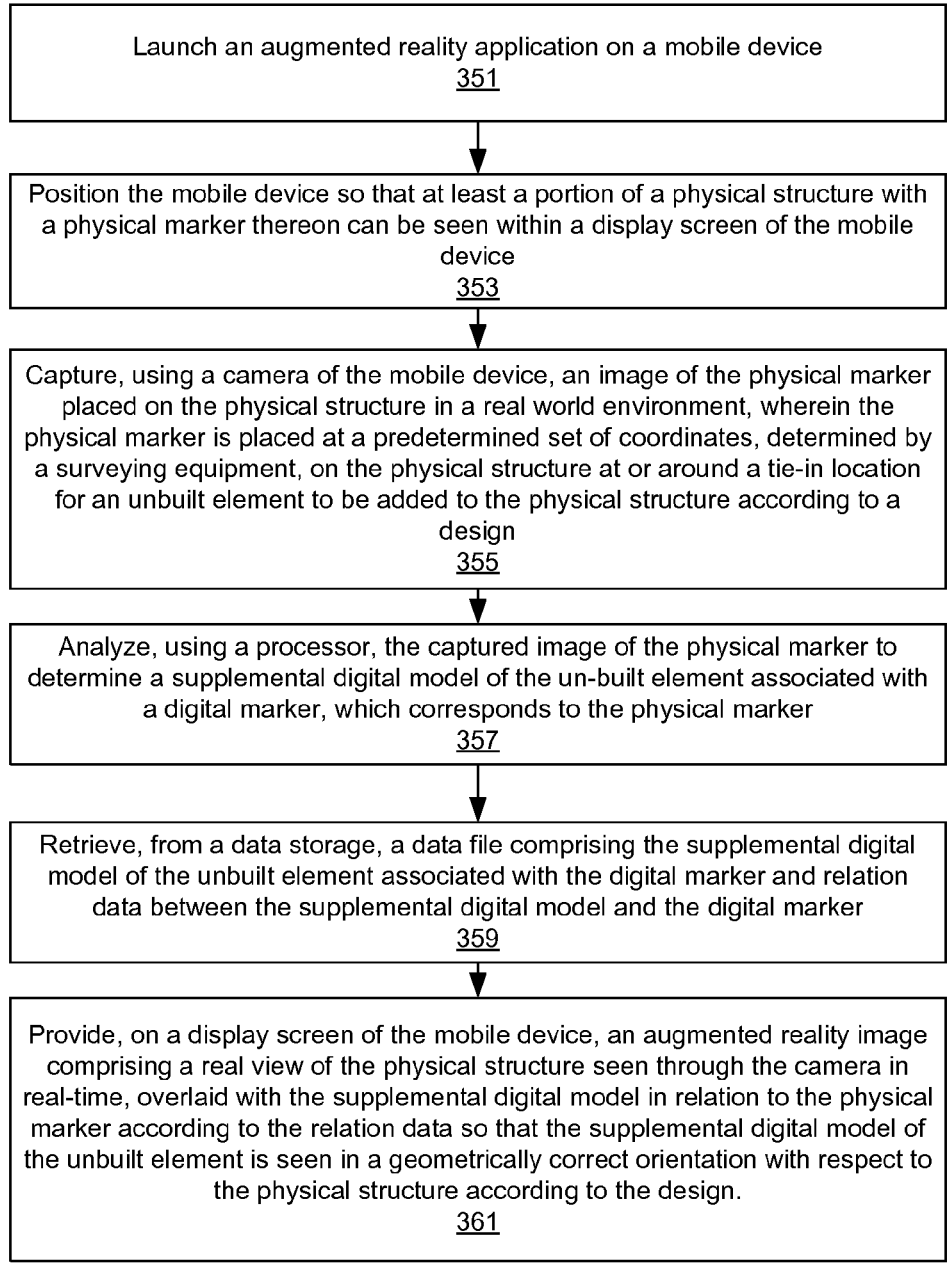

FIG. 3C shows a flowchart illustrating a method of using a mobile device running an augmented reality application to view an augmented image comprising a real view of a physical structure in real-time overlaid with a 3D digital model according to an embodiment of the present invention. Each step shown in FIG. 3C is also illustrated in FIG. 1 with references to components of the system associated with each step.

In step (351) of the method, a user launches an augmented reality application on a mobile device 140. The user can position the mobile device 140 so that at least a portion of the physical structure 101 with the physical marker 103 thereon can be seen within the display screen of the mobile device 140 in step (353). The user can stand at any suitable distance from the physical marker as long as the physical marker can be detected and decoded by the camera of the mobile device 140.

In step (355) of the method, using the camera 141 of the mobile device 140, an image of the physical marker 103 placed on the physical structure in a real environment can be captured. As described in relation to FIG. 3B, the physical marker is placed at a predetermined set of coordinates determined by surveying equipment in an embodiment of the present invention. In one embodiment, the physical marker is placed at or around a tie-in location as described above in relation to FIG. 3B. This way, a user can visualize how the unbuilt design element ties in and appears with the rest of the physical structure using the mobile device running an AR application. When visualizations of other portions of the unbuilt element are desired, then the physical marker can be placed at other suitable locations so that supplemental digital models associated with other portions of the unbuilt element can be visualized.

In step (357) of the method, the captured image of the physical marker is analyzed, using a processor, to determine a 3D digital model of the unbuilt element portion ("supplemental digital model") associated with the marker. As discussed above, each marker includes marking elements with a unique pattern that can be decoded for embedded data. In an embodiment, the captured image of the physical marker can be analyzed and decoded by the processor of the mobile device. Alternatively or additionally, the captured image of the marker can be transmitted to the server computer 120 or a third party site for analysis, and the decoded data can be transmitted back to the mobile device 140.

In step (359) of the method, based on the decoded data, a data file comprising the supplemental digital model associated with a digital marker (which corresponds to the physical marker 103 on site) is retrieved from data storage. Based on the decoded data, the data file can be retrieved from the local data storage 147 of the mobile device 140. Alternatively, a request for a data file comprising the supplemental digital model can be transmitted to the server computer 120 or a third party site, and the data file retrieved from remote server storage can be received by the mobile device.

In step (361), the method includes providing, on the display screen of the mobile device 140, an augmented reality image comprising a real view of the physical structure in the real environment seen through the camera 141, overlaid with the supplemental digital model representing the unbuilt element. In embodiments of the present invention, the supplemental digital model is displayed according to the size, position, and orientation of the physical marker 103. Since the supplemental digital model overlays on top of the physical marker which has been placed at a surveyed set of predetermined coordinates at or around the tie-in location, the supplemental digital model of the unbuilt element is displayed in a geometrically correct orientation with respect to the existing physical structure 101 seen through the camera according to the intended design. In other words, the geometric parameters (e.g., dimensions, angles, or the like) of the overlaid supplemental digital model (of the unbuilt element) in relation to the physical structure 101 seen through the mobile device are same or substantially same as the geometric parameters of the supplemental digital model in relation to the physical structure digital model as shown in a CAD model. In an embodiment of the present invention, the supplemental digital model seen through the mobile device display screen may be visualized within ⅛ of an inch accuracy with at least a 95 percent confidence level as shown in the CAD model.

Using the mobile device, a user can walk around the project site and view the augmented reality image from various angles and distances from the physical structure as long as the physical marker can be captured and decoded by the mobile device. As the user walks around the project site or tilts the mobile device, the plane (i.e., physical surface) at which the physical marker 103 is affixed can change its orientation with the camera image plane. When such a change is detected by the mobile device, a matrix transformation may be performed and the scene seen through the mobile device can be adjusted to match the change in the mobile device position. This way, the supplemental digital model of the unbuilt element can still be visualized in the geometrically correct orientation with respect to the physical structure.

It should be appreciated that the specific steps illustrated in FIG. 3C provides a particular method of overlaying a supplemental digital model in a real environment according to an embodiment of the present invention. Other sequences of steps may also be performed according to alternative embodiments. For example, alternative embodiments of the present invention may perform the steps outlined above in a different order. Moreover, the individual steps illustrated in FIG. 3C may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9A:
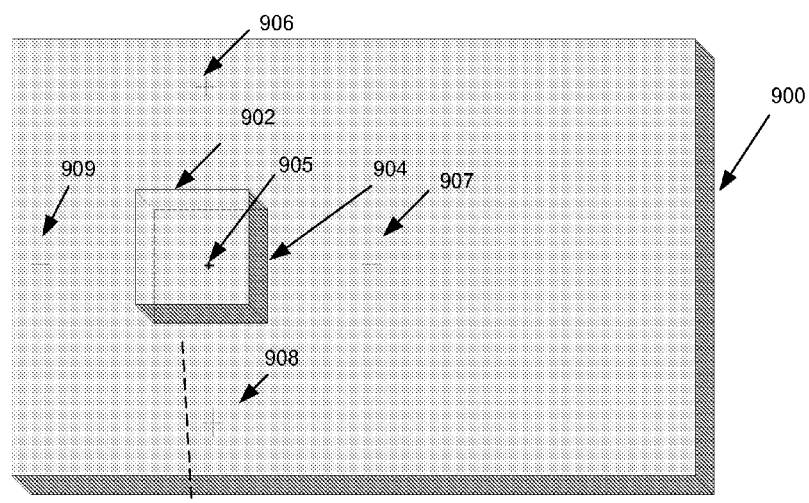
FIGS. 9A-9G show association of a supplemental digital model with a marker and extracting coordinates for placing the marker in the real environment according to an embodiment of the present invention.

FIGS. 9A to 9G illustrate examples of associating a supplemental digital model with a digital marker in the AR module 124 using relative distance calculations from the 3D modeling module 122. FIG. 9A illustrates a 3D digital model of a wall 900 ("wall digital model"), shown on the computer screen, which is generated by the 3D modeling module 122. The wall digital model 900 can be based on point cloud data obtained by surveying and laser scanning a physical wall with control targets in the real environment. Since coordinates of the control targets are known in a real-world coordinate system, coordinates of any location associated with the wall digital model can be determined by clicking and selecting any location on the model.

In FIG. 9A, a 3D digital model of a block 902 (i.e., supplemental digital model), which is unbuilt and in the design phase, is imported into the 3D modeling software and is incorporated into the wall digital model 900 at a desired tie-in location 904 according to an intended design. Any location of the supplemental digital model 902 that touches the wall digital model 900 (e.g., the bottom surface of the model 902) is referred to as the tie-in location. The coordinates of any points associated with the tie-in location 904 can be determined by clicking and selecting a point at the tie-in location 904. In addition, since the supplemental digital model 902 is incorporated into the wall digital model 900, the supplemental digital model 902 now exists in the same coordinate system as the wall digital model 900. Thus, coordinates of any location selected on the supplemental digital model 902 (or any point in the 3D space surrounding the digital models) can also be determined.

Figure 9B:
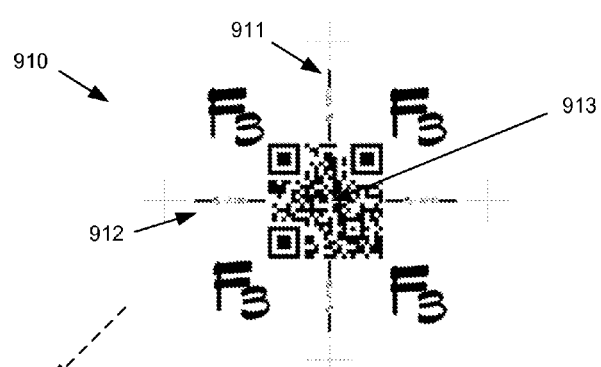
Figure 9C:
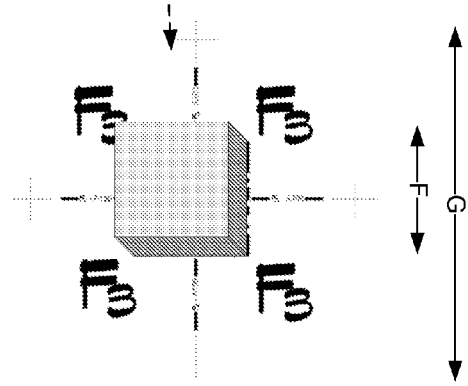

In the example shown in FIGS. 9A-9E, a user selects the tie-in location 904 of the supplemental digital model 902 to be a marker location so that it can serve as an anchor point to anchor the supplemental digital model to the marker location during augmented reality visualization. More specifically, the user selects the center point 905 of the tie-in location to be the center point of the marker. In this example, the relative distance between the center of the tie-in location for the supplemental digital model and the center point 905 of the marker is zero since the two center points are located at the same location. The user also selects four additional marker points 906, 907, 908, and 909 surrounding the center point 905 to provide bearings and orientation for the supplemental digital model 902 in relation to the marker. For example, a line drawn between the marker points 906 and 908 and a line drawn between marker points 907 and 909 are perpendicular to each other (forming a cross-hair with the center at marker point 905). These lines (not shown in FIG. 9A) can be used to position and orient the supplemental digital model 902 in relation to a digital marker in the AR module as shown in FIG. 9C. The relative distances of these marker points with respect to one another and in relation to the supplemental digital model 902 position can also be calculated.

Figure 9D:
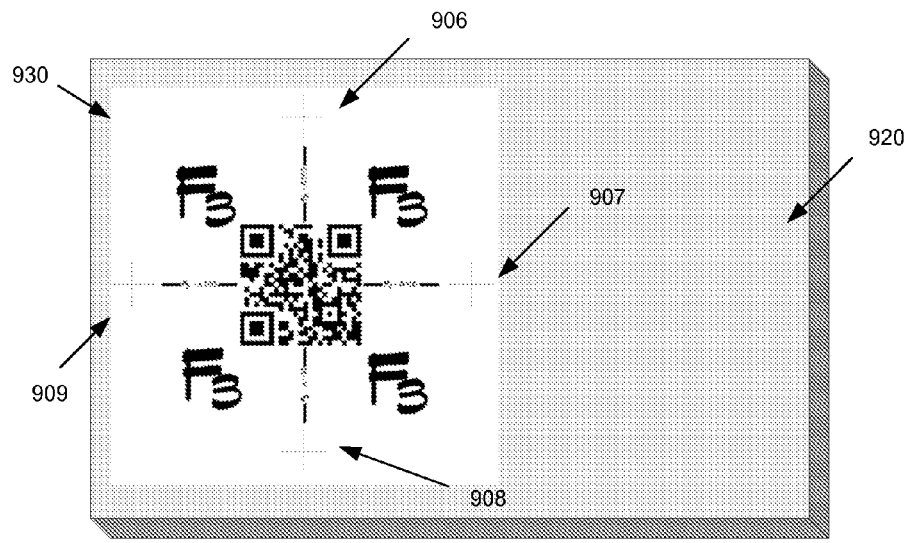

The coordinates of each of the center marker point 905 and the surrounding marker points 906, 907, 908, and 909 can be extracted from the 3D modeling module (e.g., Auto-CAD™). These coordinates can be given to a land surveyor on the project site so that the surveyor can use the surveying equipment to determine these coordinates on the physical wall. Through surveying, the positions of these marker points can be determined within at least ⅛ of an inch accuracy with at least a 95 percent confidence level. These marker points, determined by the surveying equipment, are noted as "+" on the physical wall 920 as shown in FIG. 9D by the surveyor. Using these surveyed marker points, a physical marker can be positioned, oriented, and attached on the physical wall as described below. In an embodiment, after the surveyor determines these five marker points, a big cross-hair, can be drawn to assist placement of the physical marker at these extracted coordinates on the physical wall.

FIG. 9B illustrates a digital marker 910 generated by the AR module 124 of the server computer 120, which is displayed on the computer screen. The user selects the digital marker 910 to be associated with the supplemental digital model 902 shown in FIG. 9A. The cross-hair (with lines 911 and 912) meets at the center point 913 of the digital marker as shown in FIG. 9B.

In FIG. 9C, the supplemental digital model 902, which is formatted in a suitable file format, is imported into the AR module 124 to be associated with the digital marker 910. The center of the supplemental digital model is set to be placed at the relative distance from the center point of the marker, as was calculated in the 3D modeling software. In this example, the relative distance between the two center points is zero. Thus, the center point of the tie-in location surface of the supplemental model 902 overlaps with the center marker point 913 of the digital marker 910. The cross-hair of the digital marker (formed by lines 911 and 912) shown in FIG. 9C also align with the cross-hair formed by four marker points 906, 907, 908, and 909 in the 3D modeling software shown in FIG. 9A. While FIG. 9C illustrates a visual association of the supplemental digital model with the digital marker, the AR module may receive numerical values of relatives distances as inputs to set the digital model placement relative to the digital marker without visually displaying the association.

After associating the supplemental digital model 902 with the digital marker 910, a data file is generated to store the supplemental digital model 902 and the relation data. The relation data includes information related to the relative scale, position, and orientation of the supplemental digital model 902 with respect to the digital marker 910.

FIG. 9D illustrates the real environment with a physical wall 920, from which the digital wall model 900 shown in FIG. 9A was generated. The digital marker 910 may be printed on a physical surface (e.g., paper) to provide a physical marker 930 which is affixed to the physical wall 920 in the real environment. The physical marker 930 is printed in a selected size based on the dimensions of the digital marker size (which are determined by the supplemental digital model size). For example, if the side F of the supplemental digital model shown in FIG. 9C represents 5 feet, the dimension of the digital marker side G can be determined using the dimension of side F and a scale. The center of the marker is attached to the extracted coordinates of the center marker point 905. As discussed above, the extracted coordinates of four surrounding marker points 906, 907, 908, and 909 are noted as a "+" on the physical wall 920. The cross-hair of the physical marker 930 is aligned with these four surrounding marker points so that the positional and orientation relationship of the supplemental digital model and the digital marker in the AR module is preserved during augmented reality visualization.

Figure 9E:
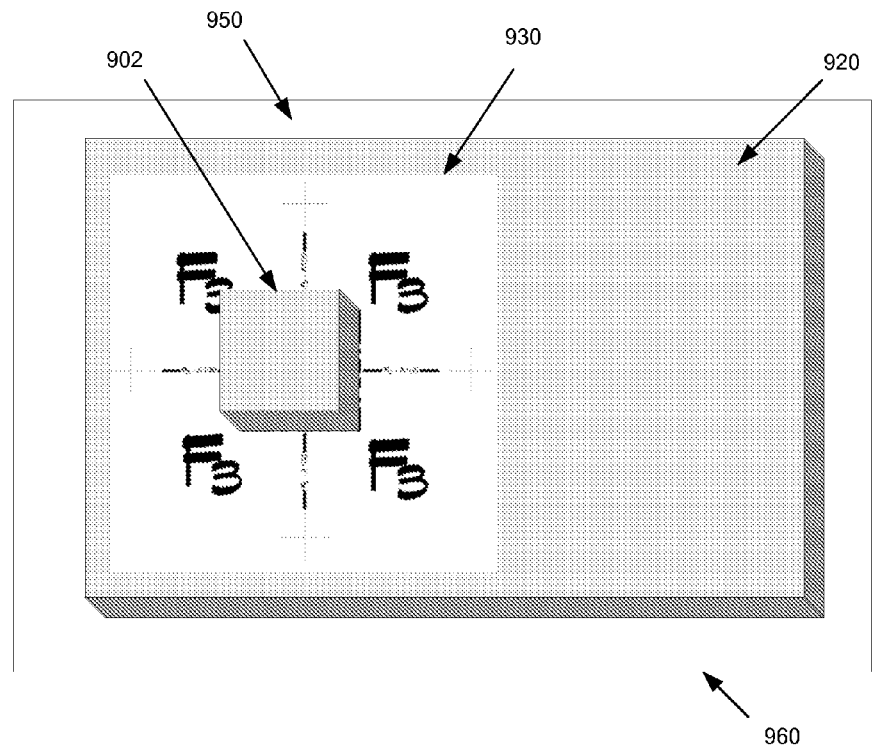

FIG. 9E illustrates an augmented reality image 950 seen through the display screen 960 of a mobile device. The augmented reality image 950 includes the physical wall 920 and the physical marker 930 seen through the camera of the mobile device. When the camera of the mobile device captures an image of the physical marker 930, the mobile device decodes the digital marker 930 and retrieves a data file associated with a digital marker 910 which corresponds to the physical marker 930. The data file includes the supplemental digital model 902 and relation data. When the supplemental digital model 902 is retrieved from the data storage, the supplemental digital model 902 is scaled, positioned, and oriented according to the size, position, and orientation of the physical marker 930 attached to the wall.

Figure 9F:
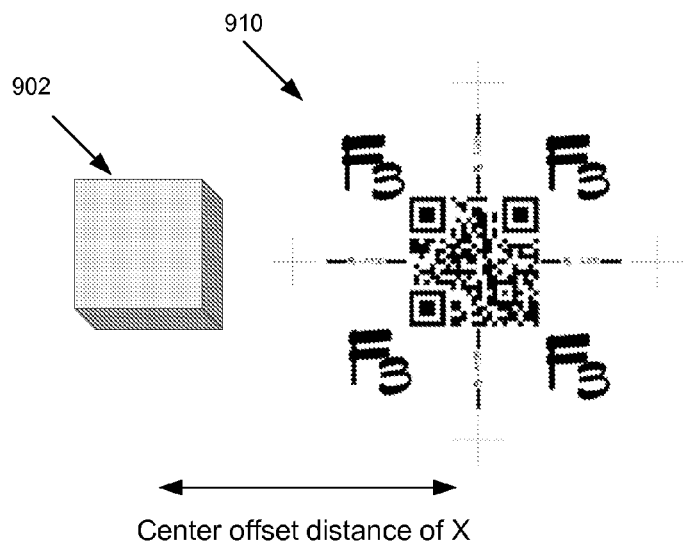
Figure 9G:
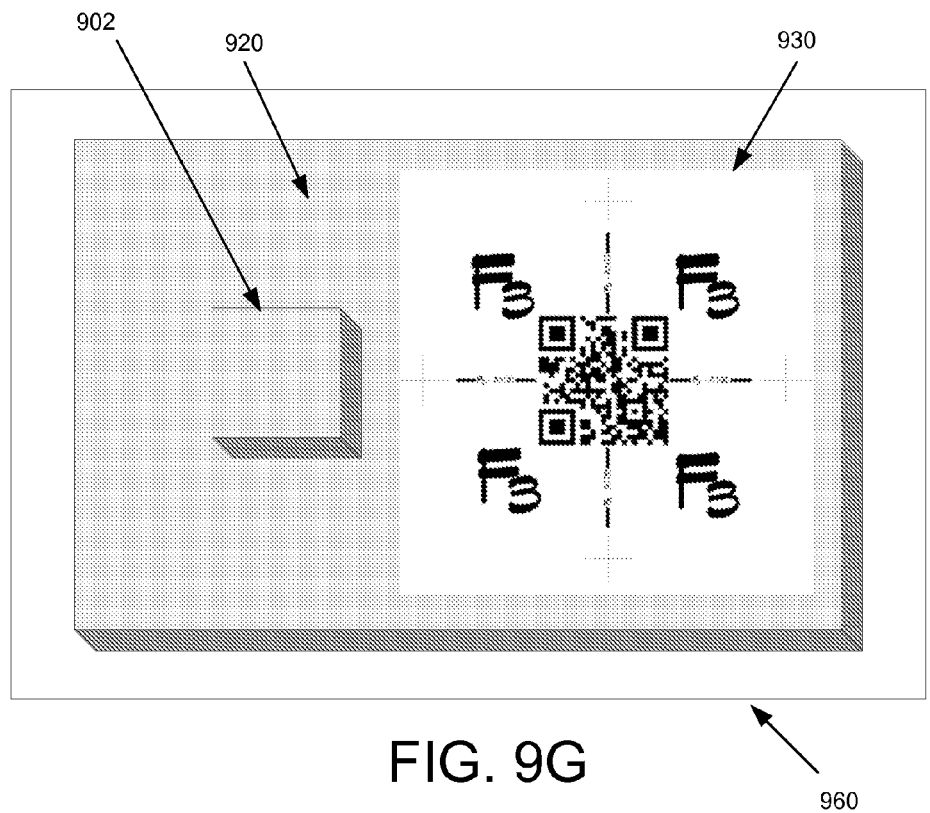

FIG. 9F illustrates an example of associating a supplemental digital model with a digital marker, which is offset in distance from the supplemental digital model location. In this example, the tie-in location may have an uneven surface to flatly affix the physical marker, or a different marker location away from the tie-in location may be desired for aesthetics. In the example shown in FIG. 9F, the supplemental digital model and the digital marker are associated in the AR module such that the center of the supplemental digital model is offset by distance X from the center of the digital marker. This relative distance calculated in the 3D modeling software is provided as an input into the AR module when associating the supplemental digital model with the digital marker. The relative calculated distances of other marker points surrounding the center marker point can also be calculated and provided as inputs into the AR module. FIG. 9G illustrates a physical marker 930 affixed to a physical wall 920 at calculated marker points which were determined by surveying on the project site. When the supplemental digital model 902 is retrieved from data storage, the center of the supplemental digital model is overlaid on top of the tie-in location, offset by distance X from the center of the physical marker 930 according to their association in the AR module.

FIGS. 9A-9G illustrate exemplary embodiments for associating a supplemental digital model with a marker. The scope of the present invention is not limited by these exemplary embodiments, and other suitable techniques can be used to associate a supplemental digital model with one or more markers so that a supplemental digital model can be visualized at a proper position and orientation with respect to the physical structure in the real environment during augmented reality visualization. For example, FIGS. 9A-9G illustrate the marker points being on the same plane as the tie-in location. In some embodiments, the marker points can be on a plane which is parallel but in front of the tie-in location. In other embodiments, the marker points can be on a plane which is not parallel to the plane of the tie-in location. In these embodiments, additional relative distances and angles among the marker points and the supplemental digital model position are calculated, and these values are provided as inputs into the AR module.

Figure 4:
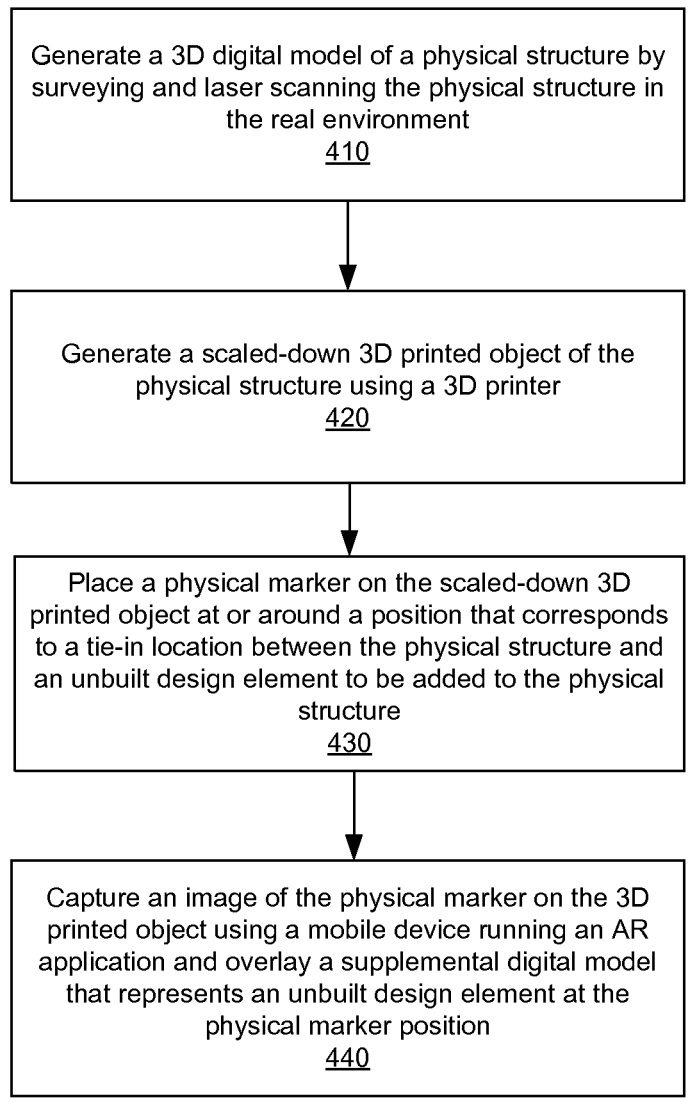
FIG. 4 shows a flow diagram illustrating a method of providing coordinate geometry augmented reality off-site on a 3D printed object of a physical structure according to an embodiment of the present invention.

FIG. 4 shows a flowchart illustrating a method for providing an augmented reality image comprising a 3D digital model of an unbuilt element ("supplemental digital model") overlaid on top of a real-time, real view of a scaled down a 3D model object of a physical structure ("3D printed object") according to an embodiment of the present invention. When it is not possible to go to a project site to render visualization of an unbuilt design element as described in FIGS. 3A through 3C, a scaled down 3D printed object of the physical structure 101 can be used as a substitute to represent the as-built environment. The scaled down 3D printed object can be printed using a 3D printer as described below. Subsequently, the supplemental digital model can be visualized off-site by overlaying the supplemental digital model on top of a real view of the 3D printed object (representing the physical structure 101) seen through the camera of a mobile device in real-time.

In the method shown in FIG. 4, a 3D digital model of the physical structure 101 ("physical structure digital model") can be created using 3D modeling software, such as AutoCAD™ in step (410). In an embodiment of the present invention, the method steps (301) through (307) described in relation to FIG. 3A can be applied in step (410) to generate the physical structure digital model. For example, the project site with the physical structure 101 can be surveyed and laser scanned, and the point cloud and coordinate data associated with the physical structure 101 can be imported into the 3D digital modeling software to generate the physical structure digital model.

Based on the physical structure digital model, a scaled down 3D printed object can be printed using a 3D printer in step (420). Any suitable 3D printers, such as Fortus 3D™ protection systems from Stratasys™, can be used in embodiments of the present invention. A 3D printer generally uses additive processes, in which a 3D printed object is created by laying down successive layers of material (e.g., depositing droplets of melted plastic material, powder, or the like through a nozzle). Since the 3D digital model is based on accurately surveyed and scanned data, the scaled down 3D printed object printed based on the physical structure digital model is a precise, scaled down reproduction of the physical structure 101 in the real environment. Additional description related to 3D printing of a 3D printed object is provided in U.S. patent application Ser. No. 13/551,618, filed on Jul. 18, 2012, the disclosure of which is hereby incorporated by reference in its entirety for all purposes.

Referring to FIG. 4, a marker which is associated with the supplemental digital model can be placed on the scaled-down 3D printed object for viewing the supplemental digital model through a mobile device running an AR application in step (430). In an embodiment of the present invention, a physical marker on a separate sheet can be affixed on the 3D printed object at a position that corresponds to a surveyed tie-in location between the physical structure and an unbuilt design element. In this embodiment, the position on the 3D printed object that corresponds to the tie-in location can be determined using a scaled ruler or other measuring devices.

In another embodiment of the present invention, the position on the 3D printed object that corresponds to the tie-in location (or any other suitable marker locations) can be printed on the 3D printed object itself during the 3D printing process. When the physical structure digital model is generated in step (410), the digital model can be modified to include a marking that represent a tie-in location between the physical structure 101 and the unbuilt design element. For example, a user can select and click on the tie-in location of the physical structure digital model shown on the computer screen. The user can modify the physical structure digital model to incorporate a marking at a position that corresponds to the tie-in location. For example, a marking can be a symbol, letter, or a number, such as "T" to indicate the tie-in location. When the modified physical structure digital model is printed by the 3D printer, the marking can be embossed on the 3D printed object to indicate the tie-in location. The marking on the 3D printed object can be then used to affix a physical marker on the 3D printed object. Alternatively, the marking printed on the 3D printed object can have marking elements with a unique pattern that can be detected and decoded by the mobile device. In this alternative embodiment, the marking embossed or imprinted on the 3D printed object itself can be used as a marker to initiate and facilitate the augmented reality process.

After the marker is positioned at or around a position that corresponds to the tie-in location, a mobile device running an AR application can be used to capture an image of the marker placed on the scaled-down 3D printed object in step (440). In an embodiment of the present invention, the method steps (351) through (361) described in relation to FIG. 3C can be applied in step (440), except that the 3D printed object is used to provide the as-built environment rather than the physical structure 101 on site. As discussed in relation to FIG. 3C, the supplemental digital model associated with the marker can be overlaid at the tie-in location of the 3D printed object based on the size, position, and orientation of the marker. Thus, using the mobile device running an AR application, the supplemental digital model can be seen in a geometrically correct orientation with respect to the 3D printed object according to an intended design.

It should be appreciated that the specific steps illustrated in FIG. 4 provide a particular method of overlaying a supplemental digital model over a real view of the 3D printed object seen through the camera of a mobile device in real-time according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8A:
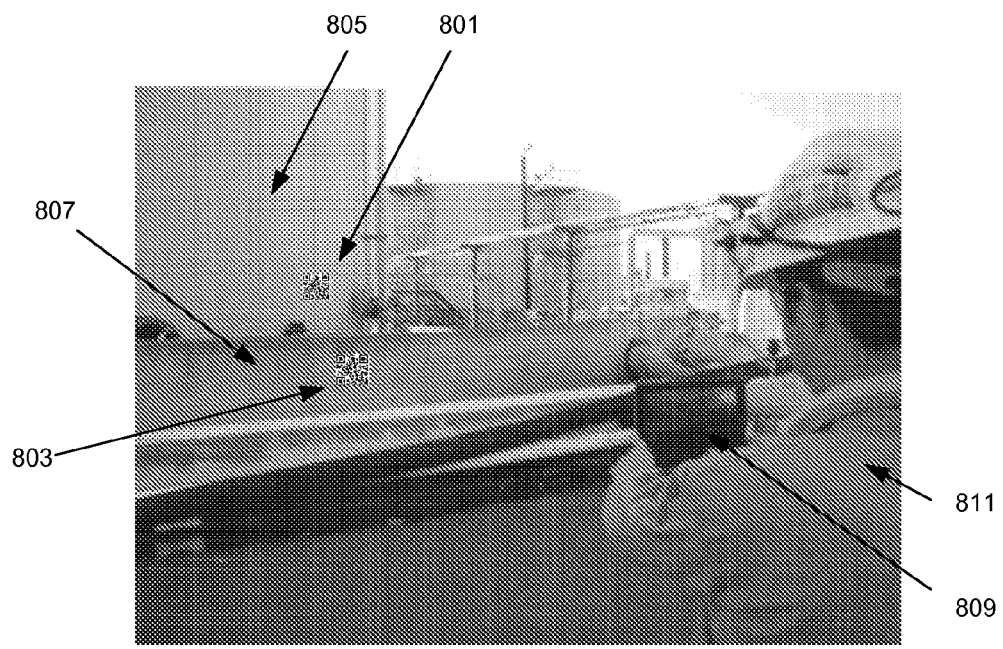
FIGS. 8A and 8B show supplemental digital models of an unbuilt pipe overlaid over the walls in the real environment using markers according to an embodiment of the present invention.

FIG. 8 illustrates an exemplary embodiment of overlaying a 3D digital model of an unbuilt pipe over a real-time, real-world view of a physical structure on a project site seen through the camera of a tablet computer. As shown in FIG. 8A, a physical marker 801 is placed on a building wall 805, and a marker 803 is placed on a retaining wall 807. The physical markers are positioned at tie-in locations for a new pipe (unbuilt at the design stage) to be added to the building wall 805 and extending through the retaining wall 807. The real-world coordinates for the tie-in locations are extracted from a 3D digital CAD model of the building, the retaining wall, and the new pipe. The surveying equipment is used to determine these coordinates associated with the tie-in locations on the building wall 805 and the retaining wall 807, respectively. As shown in FIG. 8A, a user 811 standing at a distance captures the two markers 801 and 803 attached to the building wall 805 and the retaining wall 807, respectively, in the real environment with the camera of a tablet computer 809.

Figure 8B:
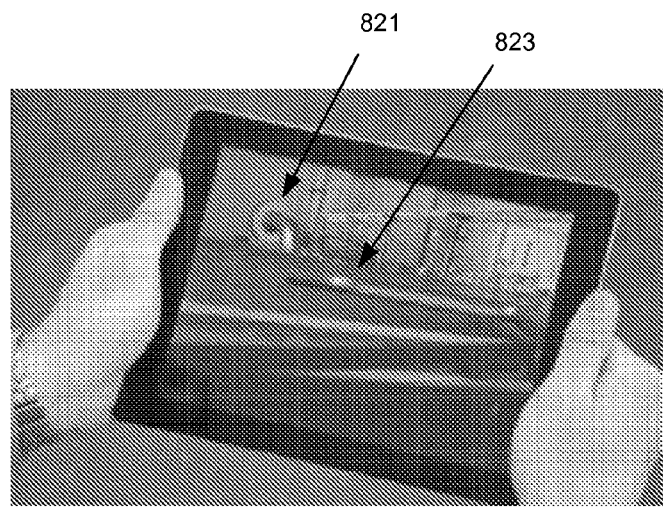

As shown in FIG. 8B, a 3D digital model of the unbuilt pipe is retrieved from the tablet computer 809 and is overlaid on top of a real-time, real-world view of the building and the retaining wall seen on the display screen of the tablet computer 809. In the embodiment illustrated in FIG. 8B, each marker is associated with a different portion of the 3D digital model of the unbuilt pipe. The marker 801 is associated with a first portion 821 of the unbuilt pipe design, and the marker 803 is associated with a second portion 823 of the unbuilt pipe design. When the physical markers are captured by the tablet computer 809, the tablet computer analyzes and decodes the physical markers and retrieves data files associated with the markers. As shown in FIG. 8B, the first portion 821 of the 3D digital model of the unbuilt pipe design is retrieved from the tablet computer and is overlaid on top of the marker 801. The second portion 823 of the 3D model of the unbuilt pipe design is retrieved from the tablet computer and is overlaid on top of the marker 803. Since the markers are placed on the building wall 805 and the retaining wall 807 at the tie-in locations determined by surveying, the 3D digital model of the unbuilt pipe design is overlaid in a geometrically correct orientation with the building wall 805 and the retaining wall 807 seen through the camera of the tablet computer 809.

While the embodiment illustrated in FIGS. 8A and 8B illustrate a physical structure (building wall and retaining wall) seen from the exterior on a project site, embodiments of the present invention are not limited to an augmented reality image of exterior features of a physical structure. In embodiments of the present invention, a physical structure may include a physical structure seen from the interior. For example, a physical structure may be an interior wall, ceiling, or other features inside of a room, and an unbuilt element in the design phase may be a staircase or other design elements to be added to the room interior.

Figure 7:
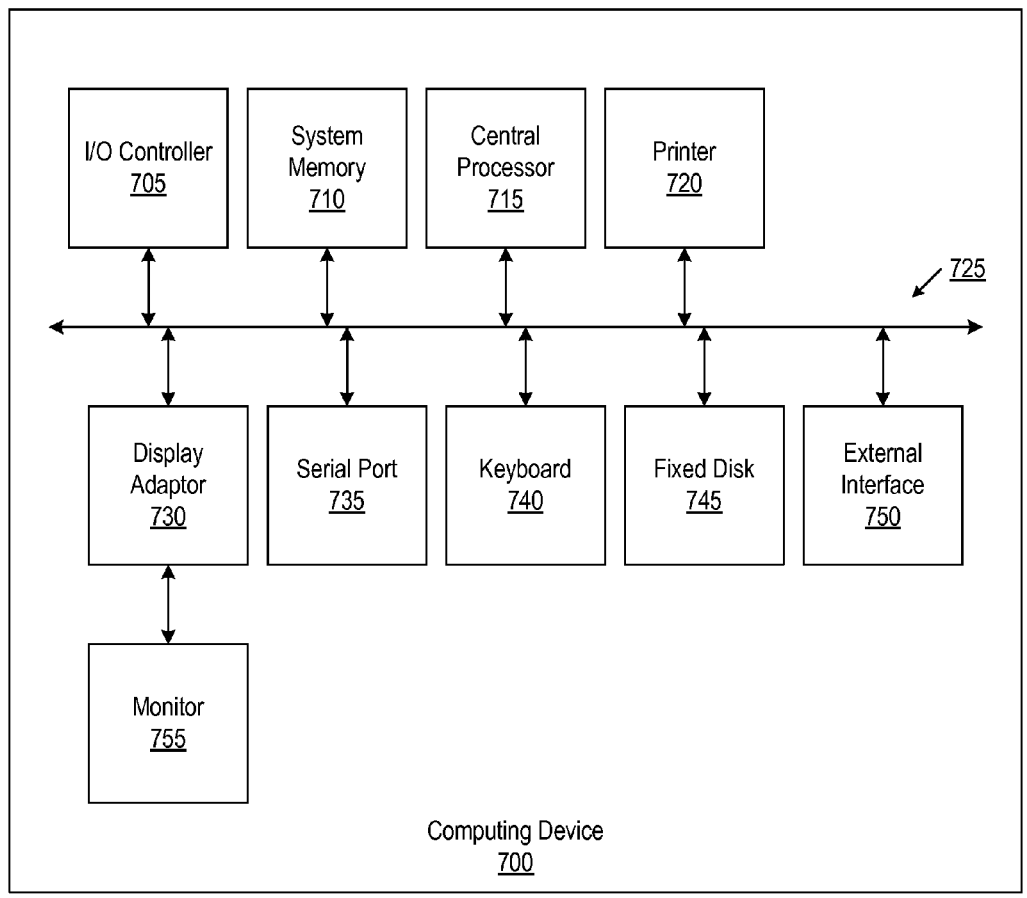
FIG. 7 shows a block diagram of a computer apparatus according to an embodiment of the present invention.

The various participants and elements described herein may operate one or more computer apparatuses (e.g., a server computer or a mobile device) to facilitate the functions described herein. Any of the elements in the above-described Figures, including any servers or databases, may use any suitable number of subsystems to facilitate the functions described herein. Examples of such subsystems or components are shown in FIG. 7. The subsystems shown in FIG. 7 are interconnected via a system bus 725. Additional subsystems such as a printer 720, keyboard 740, fixed disk 745 (or other memory comprising computer readable media), monitor 755, which is coupled to display adapter 730, and others are shown. Peripherals and input/output (I/O) devices, which couple to I/O controller 705 (which can be a processor or other suitable controller), can be connected to the computer system by any number of means known in the art, such as serial port 735. For example, serial port 735 or external interface 750 can be used to connect the computer apparatus to a wide area network such as the Internet, a mouse input device, or a scanner. The interconnection via system bus allows the central processor 715 to communicate with each subsystem and to control the execution of instructions from system memory 710 or the fixed disk 745, as well as the exchange of information between subsystems. The system memory 710 and/or the fixed disk 745 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

One or more features from any embodiment may be combined with one or more features of any other embodiment without departing from the scope of the invention.

A recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

All patents, patent applications, publications, and descriptions mentioned above are herein incorporated by reference in their entirety for all purposes. None is admitted to be prior art.

What is claimed is:

1. A method for providing coordinate geometry augmented reality for visualizing a 3D digital model in a real environment, the method comprising:
   placing a physical marker at a predetermined set of coordinates on or around a physical structure in the real environment, wherein the predetermined set of coordinates was determined by surveying equipment, the predetermined coordinates corresponding to a tie-in location where a supplemental digital model that represents an unbuilt element joins a physical structure digital model of the physical structure according to a design, the physical structure digital model formed using at least the surveying equipment;
   capturing, using a camera of the mobile device, an image of the physical marker placed on or around the physical structure in the real environment,
   analyzing, using a processor, the image of the physical marker to determine the supplemental digital model that represents the unbuilt element associated with a digital marker, which corresponds to the physical marker;

retrieving, from data storage, a data file comprising the supplemental digital model associated with the digital marker and relation data between the supplemental digital model and the digital marker;

providing, on a display screen of the mobile device, an augmented reality image comprising a real view of the physical structure seen through the camera in real-time, overlaid with the supplemental digital model in relation to the physical marker according to the relation data so that the supplemental digital model representing the unbuilt element is seen in a geometrically correct orientation with respect to the physical structure according to the design.

2. The method of claim 1 wherein the marker comprises a QR code.

3. The method of claim 1 wherein the marker comprises marking elements with a unique pattern that are decodable to determine the data file that comprises the supplemental digital model and the relation data.

4. The method of claim 3 wherein the data file that comprises the supplemental digital model and the relation data is retrieved from data storage of the mobile device or data storage of a remote server computer via a communication medium.

5. The method of claim 1 wherein the augmented reality image further comprises supplemental content related to the unbuilt element.

6. The method of claim 1, further comprising:
detecting a change of the mobile device's position and orientation relative to a physical surface at which the physical marker is placed; and
adjusting positioning and orientation of the supplemental digital model contemporaneous to the detecting so that the supplemental digital model remains seen in the geometrically correct orientation with respect to the physical structure according to the design.

7. The method of claim 1 wherein the relation data include information related to a relative size, position, and orientation of the supplemental digital model in relation to the digital marker.

8. The method of claim 1, further comprising:
surveying, with the surveying equipment, the real environment with the physical structure to determine the predetermined set of coordinates in a real-world coordinate system at or around the tie-in location to place the physical marker in the real environment.

9. The method of claim 1 wherein the physical marker is placed at the predetermined set of coordinates within about ⅛ inch of accuracy with at least a 95 percent confidence level.

10. The method of claim 1 wherein the mobile device is a tablet computer.

11. The method of claim 1 wherein the tie-in location is where the unbuilt element digital model touches the physical structure digital model.

12. The method of claim 11 wherein the unbuilt element digital model and the physical structure digital model form a composite digital model.

13. The method of claim 1 wherein the data storage is present in a server computer that is remotely located with respect to the mobile device.

14. The method of claim 1 wherein the unbuilt element is a pipe and the physical structure is at least part of a building.

15. The method of claim 1 wherein the unbuilt element is a first unbuilt element, the augmented reality image is a first augmented reality image, and the supplemental digital model is a first supplemental digital model, and wherein the method further comprises:
providing, on the display screen of the mobile device, a second augmented reality image comprising a real view of the physical structure seen through the camera in real-time, overlaid with a second supplemental digital model in relation to the physical marker according to the relation data so that the second supplemental digital model representing a second unbuilt element is seen in a geometrically correct orientation with respect to the physical structure according to the design.

16. A system comprising:
a physical marker at a predetermined set of coordinates on or around a physical structure in a real world environment, wherein the predetermined set of coordinates was determined by surveying equipment, the predetermined coordinates corresponding to a tie-in location where a supplemental digital model that represents an unbuilt element joins a physical structure digital model of the physical structure according to a design, the physical structure digital model formed using at least the surveying equipment; and
a mobile device comprising
a processor,
a computer-readable medium coupled to the processor and storing a plurality of instructions, which, when executed, cause the processor to provide coordinate geometry augmented reality, the plurality of instructions comprising,
instructions that cause the processor to capture, using a camera of a mobile device, an image of a physical marker placed on or around a physical structure in the real environment,
instructions that cause the processor to analyze the image of the physical marker to determine the supplemental digital model that represents the unbuilt element associated with a digital marker, which corresponds to the physical marker,
instructions that cause the processor to retrieve, from data storage, a data file comprising the supplemental digital model associated with the digital marker and relation data between the supplemental digital model and the digital marker, and
instructions that cause the processor to provide, on a display screen of the mobile device, an augmented reality image comprising a real view of the physical structure seen through the camera in real-time, overlaid with the supplemental digital model in relation to the physical marker according to the relation data so that the supplemental digital model representing the unbuilt element is seen in a geometrically correct orientation with respect to the physical structure according to the design.

17. The system of claim 16 wherein the marker comprises marking elements with a unique pattern that are decodable to determine the data file that comprises the supplemental digital model and the relation data.

18. The system of claim 16 wherein the data file is retrieved from the data storage of the mobile device or the data storage of a remote server computer via a communication medium.

19. The system of claim 16 wherein the augmented reality image further comprises supplemental content related to the unbuilt element.

* * * * *